(12) United States Patent
Bach (10) Patent No.: US 9,194,588 B2
(45) Date of Patent: Nov. 24, 2015

(54) APPLIANCE AIRFLOW DETECTION USING DIFFERENTIAL HEATING OF ELECTRONIC DEVICES

(75) Inventor: James Carter Bach, Seymour, IN (US)

(73) Assignee: General Electric Company, Schenectady, NY (US)

( * ) Notice: Subject to any disclaimer, the term of this patent is extended or adjusted under 35 U.S.C. 154(b) by 704 days.

(21) Appl. No.: 13/192,095

(22) Filed: Jul. 27, 2011

(65) Prior Publication Data

US 2013/0025364 A1      Jan. 31, 2013

(51) Int. Cl.
| | |
|---|---|
| *G01K 17/00* | (2006.01) |
| *F24B 5/02* | (2006.01) |
| *G01F 1/688* | (2006.01) |
| *G01F 1/696* | (2006.01) |

(52) U.S. Cl.
CPC . *F24B 5/02* (2013.01); *G01F 1/688* (2013.01); *G01F 1/696* (2013.01)

(58) Field of Classification Search
CPC ... G01K 13/00; G01K 13/02; G01K 2217/00; G01K 17/00; G01K 7/00; G01F 23/00; G01F 1/688; G01F 1/696; H05B 1/02; F24B 5/02
USPC .......... 374/112, 29, 110, 114, 115, 166, 374/127–149, 40; 219/494, 623, 627; 73/204.15–204.27, 202.5, 204.5; 126/1 R, 15 A, 273 R, 19 R, 275 R
See application file for complete search history.

(56) References Cited

U.S. PATENT DOCUMENTS

| | | | |
|---|---|---|---|
| 3,553,403 A | 1/1971 | Porwancher | |
| 4,304,127 A * | 12/1981 | Feller | 374/41 |
| 4,741,476 A * | 5/1988 | Russo et al. | 236/46 R |
| 6,287,108 B1 | 9/2001 | Rothenberger et al. | |
| 7,119,308 B2 * | 10/2006 | Kopel | 219/494 |
| 7,607,823 B2 | 10/2009 | Kent | |
| 7,730,793 B2 | 6/2010 | Speldrich | |
| 7,775,706 B1 * | 8/2010 | Feller | 374/29 |
| 2006/0175322 A1 | 8/2006 | Beak et al. | |
| 2007/0140309 A1 * | 6/2007 | Ariyoshi | 374/29 |
| 2008/0066541 A1 * | 3/2008 | Burton | 73/204.15 |
| 2008/0236273 A1 * | 10/2008 | Dmytriw et al. | 73/204.17 |
| 2008/0271545 A1 * | 11/2008 | Burton | 73/861.85 |
| 2009/0241943 A1 | 10/2009 | Schwank et al. | |
| 2010/0163549 A1 * | 7/2010 | Gagas et al. | 219/622 |
| 2014/0116267 A1 * | 5/2014 | Hochschild et al. | 99/473 |
| 2015/0144616 A1 * | 5/2015 | Gagas et al. | 219/623 |

OTHER PUBLICATIONS

Dictionary.com, Appliance |Define Appliance.*
Iliopoulou et al., "The dual thin-film probe for high-frequency flow temperature measurements," Apr. 11, 2005, SAGE, Special Issue Paper, total 10 pages.*

(Continued)

*Primary Examiner* — Gail Kaplan Verbitsky
(74) *Attorney, Agent, or Firm* — Dority & Manning, P.A.

(57) ABSTRACT

Apparatus and methods are disclosed to measure airflow within a chassis-cooling pathway of an appliance. The rate of airflow is determined based on the differential heating among a pair of sensor devices, such as thermistors, transistors, diodes or resistive thermal devices operating at distinctly different power levels. The appliance utilizes the calculated airflow rate to perform safety-related tasks, such as de-energizing heating elements when low or no airflow is detected.

16 Claims, 8 Drawing Sheets

(56) References Cited

OTHER PUBLICATIONS

Types of Fluid Flow Meters, "The Engineering Tool Box", www.EngineeringToolBox.com, 7 pages, dated Mar. 14, 2011.

JM Terrade, Clermont-Ferrand, France, *Design Ideas*, www.ednmag.com, articles entitled "Video emitter uses battery power," "Circuit avoids metastability," "Microphone uses 'phantom power'", and "Measure humidity and temperature on one TTL line," pp. 95, 96, 98, 100, 102, 104, dated Aug. 30, 2001.

"Series-Connected Transistors Use Differential Heating to Sense Airflow", www.electronicdesign.com, pp. 1-5, dated Mar. 31, 2010.

* cited by examiner

APPLIANCE AIRFLOW DETECTION USING DIFFERENTIAL HEATING OF ELECTRONIC DEVICES

BACKGROUND OF THE DISCLOSURE

The present disclosure generally relates to appliances, and more particularly, to detecting airflow, and/or measuring airflow velocity, in a cooling pathway of an appliance.

Appliances such as cooking ranges are widely used. A cooking range typically includes an oven. The oven typically has a front-opening access door, and at least one heating element for heating up the inside of the oven cavity. As is known in the art, when energized, the heating element can heat up the inside of the oven cavity to a relatively high cooking temperature chosen by a user. Also as is known in the art, the cooking range often has a fan which is used to cool a component of the oven, such as the front-opening access door, or a heat sensitive component of the oven such as an electronic controller or display unit, to a temperature which is lower than the chosen cooking temperature. Some certification institutions, such as Underwriters Laboratories Inc. (UL), require that a Fan Apparency Device (FAD) be employed in the cooking range. The FAD is used to determine or detect whether the fan is working properly, that is, whether or not airflow is being created by the cooling fan.

As is known in the art, when a user selects or chooses a heating operation of the oven and turns on the oven, the turning-on supposedly activates the fan. The FAD then determines or detects whether the fan is working properly. If the fan is working properly, the FAD enables the selected heating operation of the oven to proceed. On the other hand, if the fan is not working properly, the FAD prevents the selected heating operation of the oven from proceeding. Various types of FADs are used to determine or detect whether the fan is working properly.

The most widely used FADs are thermal switches and sail switches. A thermal switch uses the heat from the oven to heat up a bimetal member of the switch to turn off the switch when the airflow from the fan is no longer present to cool off the bimetal member. Since the thermal switch usually is not disposed adjacent the intake end or the discharge end of the fan, it does not negatively affect the airflow passing through the fan. However, the thermal switch has a relatively slow reaction time. In addition, the thermal switch needs to be installed in an area of the oven where the temperature can raise quickly when the oven is turned on. Moreover, the thermal switch requires a significant amount of calibration and testing to prove that it will work as intended in all working conditions of the oven.

A typical sail switch uses the airflow generated by the fan to move a sail, typically a large, flat piece of sheet metal, to turn on or off the switch, typically containing a spring return. Compared with the thermal switch, the sail switch has a very fast reaction time, and requires significantly less testing time/effort to implement. However, the sail switch has its own limitations. In particular, when it is desirable to direct or point the exhaust end or discharge end of the fan toward the floor on which the appliance is placed, it can be difficult to satisfactorily employ the sail switch in this configuration. This is because in this configuration, the positive pressure side of the sail, which is positioned downstream of the fan, has to face up. As a result, the weight of the sail constantly urges the sail to move from its upper position where the sail opens the switch to its lower position where the sail closes the switch. To make matters worse, in this configuration the positive pressure side of the sail tends to collect a noticeable amount of dust particulates, grease, etc. All of these contribute to the problem that the sail may move to and stay in its lower position even when the fan is not activated, thus creating a false indication of the working condition of the fan. Sail switches also tend to be constructed of thin, flimsy metal and are easily damaged or knocked out of calibration during repair operations and abusive shipping disturbances (drops). Sail switches have also been prone to producing rattling/chattering noises, thus disturbing/annoying the operator of the appliance (aka the consumer).

A need is present to provide better methods and systems to measure air flow within appliances.

SUMMARY OF THE DISCLOSURE

In one aspect of the disclosure, an apparatus measures the airflow within the chassis-cooling pathway of an appliance. The apparatus is an air flow detecting device that provides a means by which the presence of airflow is determined and the approximate rate of airflow is measured. Based on the measured information the appliance control system can perform safety-related tasks, such as de-energizing the heating elements of the appliance, if there is too-low (or no) airflow.

In another aspect of the disclosure, an appliance comprises a heat source, a chassis and a cooling air passageway for circulating air around at least a part of the chassis is disclosed. An air flow measuring device that is supported and immersed within the cooling air passageway measures a rate of airflow through the cooling air passageway and includes a first device (e.g., a first thermistor or like device) that generates a self-heating effect and a second device (e.g., a second thermistor or like device) that does not self-heat and thus measures the local ambient temperature around both devices. The first device and the second device provide a voltage differential that corresponds to a difference in temperature between the first device and the second device that is inversely proportional to the rate of airflow. The two devices may be substantially identical (i.e., the same part number) but, they do not need to be if their differences are properly considered in the circuit design. The first device and second device are operated in such a manner that the first device experiences significantly more power dissipation than the second device, therefore, the first device self-heats significantly more than the second device. This can be accomplished by Pulse Width Modulating (PWM'ing) the two devices at different duty cycles. For instance, the first device can be operated at 99% while the second device can be operated at 1% (i.e. the same PWM control signal can be used to drive both circuits, with one circuit using an inverted representation of the control signal), thus the first device would dissipate 99× the power of the second device. Alternatively, the first device could be operated continuously (100%) while the second device is activated infrequently (e.g., at 1 ms once every second). In an analog implementation the difference in temperature-dependent voltages or difference in temperatures generated by the two devices is compared against a reference voltage to determine if the airflow rate is above/below a predetermined threshold. This implementation uses an analog means to determine the differences, where the analog means includes at least one of an operational amplifier, instrumentation amplifier, or comparator. In a digital (microprocessor) implementation the two device voltages would be converted to a temperature indication by a variety of means (calculation, look-up table, etc.), and the difference in temperature would be calculated and compared against a predetermined threshold. A digital means may be used to measure the differences in temperature-dependent voltages or differences in temperature, which includes a microprocessor with analog/digital ports to sample the two voltages and calculating the voltage differences mathematically In yet another embodiment, a method is disclosed for measuring air flow within an airflow passageway of an appliance. The method includes immersing a first device and a second device into the airflow of the airflow passageway. These devices could be diodes or bipolar transistors (i.e. devices having a PN junction), and the like. In one example, the devices are cycled through three processing phases. In the first phase the first device is activated in such a manner to produce self-heating; a relatively large amount of current is forced to flow through the first device, however, the second device does not experience this current. The primary purpose of the first phase is to cause a difference in self-heating between the two devices. In the second phase both devices are activated in such a manner that a very small amount of current is flowed through them, so that a baseline voltage measurement can be measured. In the third phase both devices are activated in such a manner that a larger amount of current (e.g., about 5× to 50× that of second phase, but significantly less than that of the first phase) is flowed through them, so that a second voltage measurement can be measured. The voltage difference between the phase 3 measurement and the phase 2 measurement indicates the temperature of the device, according to the following relationship typically used to measure the temperature of computer CPU cores, and upon which several commercially-available ICs (Integrated Circuits) have been developed/sold:

$$\Delta V_{BE} = \frac{k \cdot T}{q} \cdot \ln\left(\frac{I_{C1}}{I_{C2}}\right)$$

which can be rewritten as:

$$T = \frac{q \cdot \Delta V_{BE}}{k \cdot \ln\left(\frac{I_{C1}}{I_{C2}}\right)}$$

Where:
T=Temperature of the measurement device (diode, bipolar transistor, etc.)
k=Boltzmann's Constant ($1.38 \times 10^{-23}$*J/K)
q=Electronic Charge ($1.69 \times 10^{-19 \circ}$ C.) [note: C=Coulomb's, not ° C.]
$\Delta V_{BE}$=Change in Base-Emitter (or Anode-Cathode) voltage at 2 currents
$I_{C1}$=Larger of 2 measurement currents
$I_{C2}$=Smaller of 2 measurement currents Thus, knowing the ratio of the phase 3 to phase 2 currents, the difference voltage can be used to determine/calculate the device temperature. This device temperature measurement is performed for both first and second devices, and the temperature difference between the two devices is used to determine the airflow rate of the system. Phase 1 is required to cause the first device to self-heat in a consistent manner so that its temperature rise above ambient (second device) is consistently inversely proportional to airflow rate. Phase 1 is typically much longer in duration than phases 2 and 3. During phase 1 the second device experiences substantially no current, however, if the phase 2 or 3 currents are sufficiently smaller than the phase 1 current, the second device can operate at either of those levels during phase 1. An amount of airflow is determined with respect to time within the passageway based upon the voltage differential measured, wherein an increase in the voltage differential indicates a lower airflow over the time measured and a decrease in the voltage differential indicates a higher airflow over the time measured.

BRIEF DESCRIPTION OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION

Figure 1:
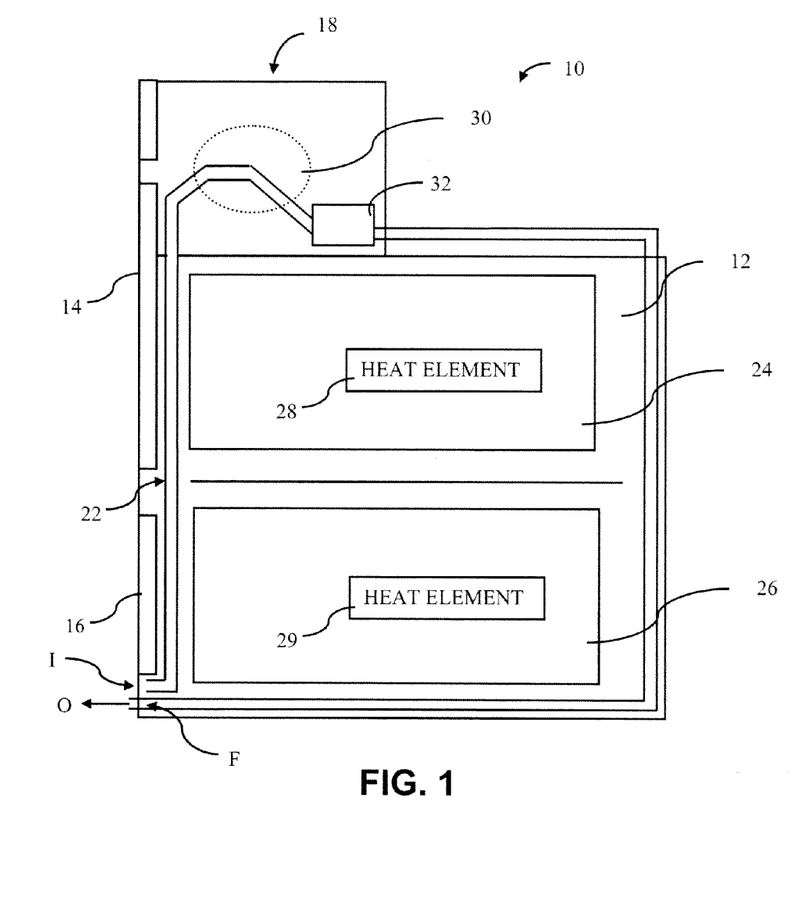
FIG. 1 is a side view of a cooking appliance such as a dual oven in which is implemented an exemplary embodiment of an airflow detection device.

Referring to FIG. 1, illustrated is an exemplary appliance according to at least one aspect of the present disclosure, such as a double wall oven 10. The double wall oven 10 includes an outer housing 12 defining an interior space in which food or other items to be heated are placed, and upper and lower doors 14 and 16 for providing access to said interior space inside of which one or more heating elements are located. An electronics bay 18 is located on an upper side 24 of the oven 10 and contains various electronic controls for operation of the oven 10. Although an oven appliance 10 is illustrated, the present disclosure is not limited to any one type of appliance. Accordingly, basic features are described in the oven 10 briefly as an exemplary aspect of some embodiments herein.

For example, the oven 10 includes one or more cooling air-flow passageways 22 for circulating air around the oven chassis and the electronics bay 18. The passageway 22 defines a flow path F for the flow of air from an inlet I near a lower side 26, up the front and through the electronics bay 18 where one or more blowers 30 ventilate air there-through. The air travels further down the rear of the oven 10 and forward to an outlet O.

The electronics bay 18 supports one or more of the blowers 30, which are activated during operation of the oven 10 to circulate air through the flow passageway 22 for cooling the oven chassis and/or electronics bay 18. The blowers 30 are configured to draw air across the electronics of the bay 18 and then exhaust the air via outlet O. The electronics bay 18 further includes an air flow measuring device 32 for detecting an air flow and a rate of the air flow in the flow passageway 22. Although the air flow measuring device 32 is illustrated within the electronics bay 18, other locations within the air flow and along the flow passageway 22 are also envisioned. For example, the air flow detection device 32 can reside at the rear of the oven 10 or anywhere else along the passageway 22.

In one embodiment, the air flow detection device 32 measures airflow through the passageway 22 and provides data related to the air flow to a main controller board residing within the electronics bay 18. In turn, the main controller board is operable to control a heating element 28 of the upper side 24 of the oven 10 and a heating element 29 of the lower side 26 of the oven 10. For example, if no air flow or substantially low air flow is detected, main controller board could control the heating elements 28 and 29 to provide less heat into the cavity, including complete deactivation of the heating elements. Other appliances having ventilation passageways and/or airflow passageways are also envisioned as within the scope of this disclosure. It is also conceivable and practicable for a double oven to contain two cooling fans 30 (one for upper, one for lower) and thus two airflow detection devices 32.

Figure 2A:
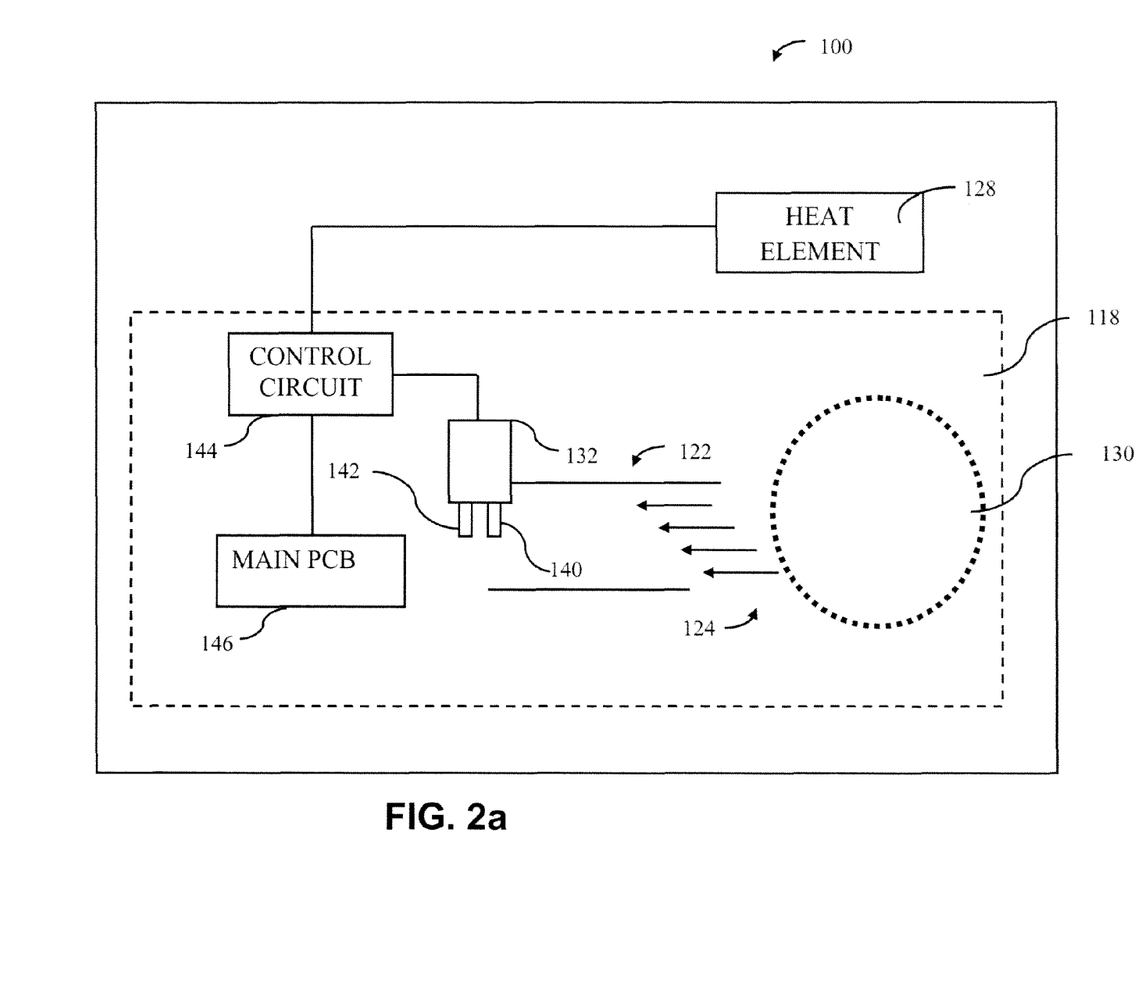
FIGS. 2a and 2b are top views of an electronics bay of the oven of FIG. 1.
Figure 2B:
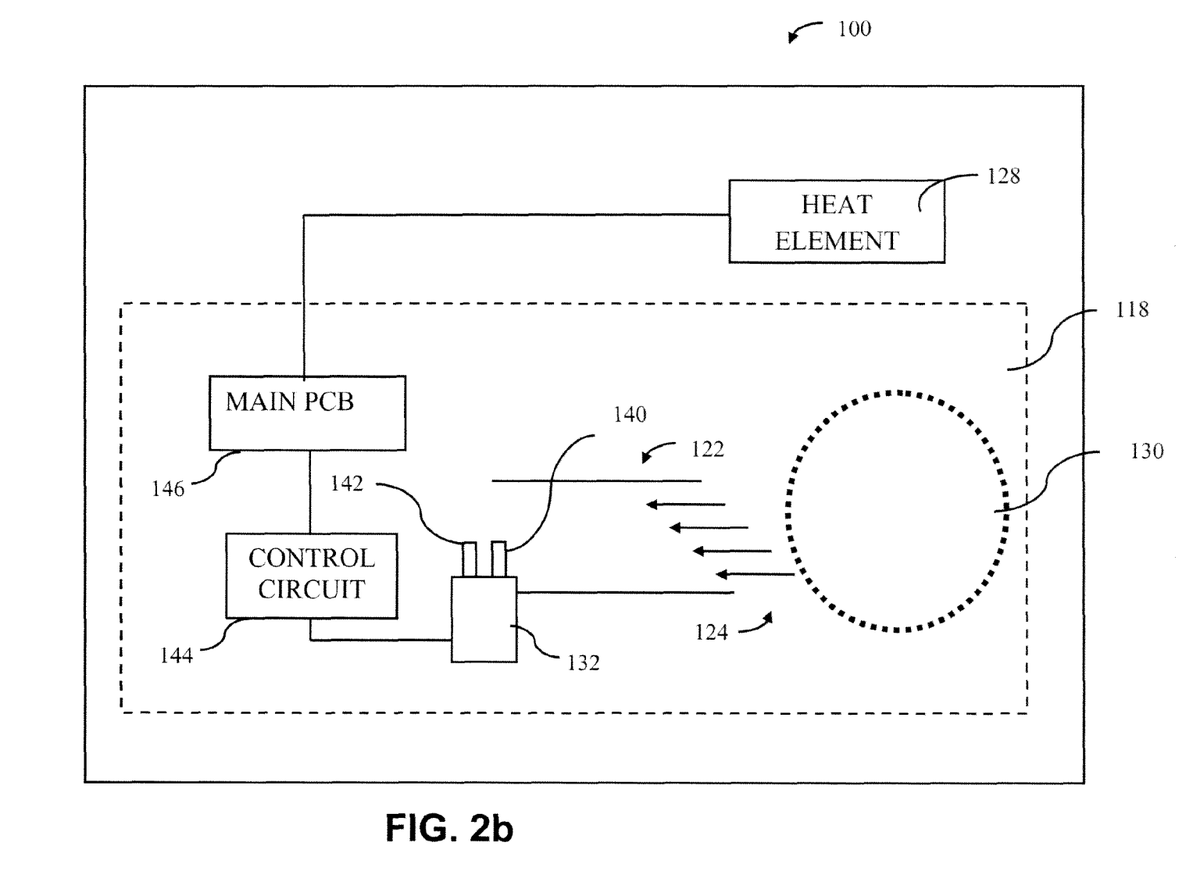

Referring to FIGS. 2a and 2b, illustrated are exemplary aspects of an airflow detector for an appliance 100. The appliance 100 includes any, appliance having an airflow passageway, such as for ovens, microwave ovens, clothes dryers, and the like.

The appliance 100 includes a heat element 128 for heating items within the appliance and at least one blower 130 for drawing air through a flow passageway 122. An airflow detector 132 detects an air flow 124 through the passageway 122 and the rate in which air is moving. The air flow detector 132 includes at least two sensor devices, a first device 140 and a second device 142 located within the airflow 124 for detecting a temperature differential, which is then used for determining the air flow and rate of air flow. For example, the devices 140 and 142 are immersed within the air flow 124 of the flow passageway 122. The control circuit 144 can include one or more processors adapted to calculate airflow velocity and/or volumetric flow rate based on the sensed air flow at the air flow detector 132 and/or an analog comparator circuit for performing the same functions. In the illustrated embodiments (FIGS. 2a and 2b), a main PCB 146 is connected to the control circuit 144 and is configured to deactivate the heating element 128 when insufficient air flow is detected. Different configurations can be envisioned in which the control circuit 144 located between the main PCB 146 and heating element 128 to directly disable the heating element as in FIG. 2a, or in which the control circuit 144 supplies a signal to the main PCB 146 so that the main PCB controls the heating element based on the state of this signal as in FIG. 2b. This disclosure is not limited to any one example. Other switching mechanisms can also be associated with the circuit board 144 for switching on or off various components of the oven based on detected airflow or the lack thereof. In some embodiments control circuit 144 is a stand-alone board/module electrically connected to a stand-alone sensor module 132 and connected to the main controller 146. In some embodiments the functionality of control circuit 144 is co-located within the main controller PCB 146. In some embodiments the control circuit 144 is co-located inside the sensor module 132. In some embodiments it is conceivable to co-locate all components (132, 144) of the airflow detection/measurement system within the main controller PCB 146. It is also conceivable to implement an embodiment, such as shown in FIG. 2a, in which the control circuit 144 (either separate from sensor module 132, or co-located with it) is interspersed in the path between the main controller 146 and the heat element 128, such that the airflow detection system (132+144) is in final control of the heat element, thus over-riding the commands from the main controller 146.

In one embodiment, the first device 140 and the second device 142 include thermistors having a variable electrical resistance according to a surrounding temperature. Although the first device and second device include thermistors in one exemplary embodiment, other solid state devices are also envisioned, such as diodes, transistors and resistance temperature detectors (RTDs). Power is applied to the first thermistor 140, which causes it to self-heat; the extent to which the thermistor self-heats (i.e. the amount of temperature rise which the thermistor experiences) is inversely proportional to the rate of airflow past the thermistor. In certain embodiments, two thermistors are employed as the first device 140 and the second device 142. The second thermistor 142 dissipates little power, and thus, does not appreciably self-heat, and is used to measure the "ambient" air temperature. The first thermistor 140 dissipates greater power compared to the second thermistor 142, and thus, it does appreciably self-heat, the extent of which is measured or detected by circuitry at the airflow detector 132. The two thermistors 140 and 142 are biased so that if no self-heating is present, thermistor circuits produce the substantially same voltage (corresponding to substantially equal temperatures). When the first thermistor 140 self-heats, due to low/no airflow, the imbalance (difference) in outputted voltage directly indicates the rate of airflow past the thermistors. This difference voltage is used to measure the airflow rate of the airstream in which the thermistors are immersed.

In one aspect of the embodiment, the two thermistors are chosen so that the impedance of the self-heating thermistor or the first device 140 is much lower than the impedance of the second device 142 or non-self-heating thermistor acting as a reference. For example, impedance difference is a factor of 5× or greater. This impedance imbalance causes the first device that operates as a sensing thermistor to dissipate considerably more power than the second device 142 that operates as a reference thermistor. As a result, in still air, the first device 140 becomes noticeable hotter than the second device due to its self-heating. In another example, the impedance disparity between thermistor 140 and 142 was 10:1, and thus, 10× more power is dissipated in the first 140 than the second thermistor 142. With still air (or very low airflow) the first device 140 heats-up considerably more than the second, and therefore, the voltage measured across the thermistors differs considerably. When there is high airflow the first thermistor 140 is cooled by convective means, and the voltage produced more nearly matches that of the second device 142 operating as a reference thermistor.

In another embodiment, the two thermistors are identical models, having the same impedance. The disparity in dissipated power is achieved by "pulsing" (pulse width modulating or PWM'ing) the Reference thermistor at a very small duty cycle (say 10% or less). Thus, although the Reference thermistor momentarily dissipates the same power as the Sensing thermistor, its overall (average) power dissipation is much less than the Measure device, and therefore it does not heat-up significantly. The voltage of both thermistors is sampled at a point in time when both thermistors are active, and the voltage difference is once again used to determine the rate of airflow around both thermistors.

Figure 3:
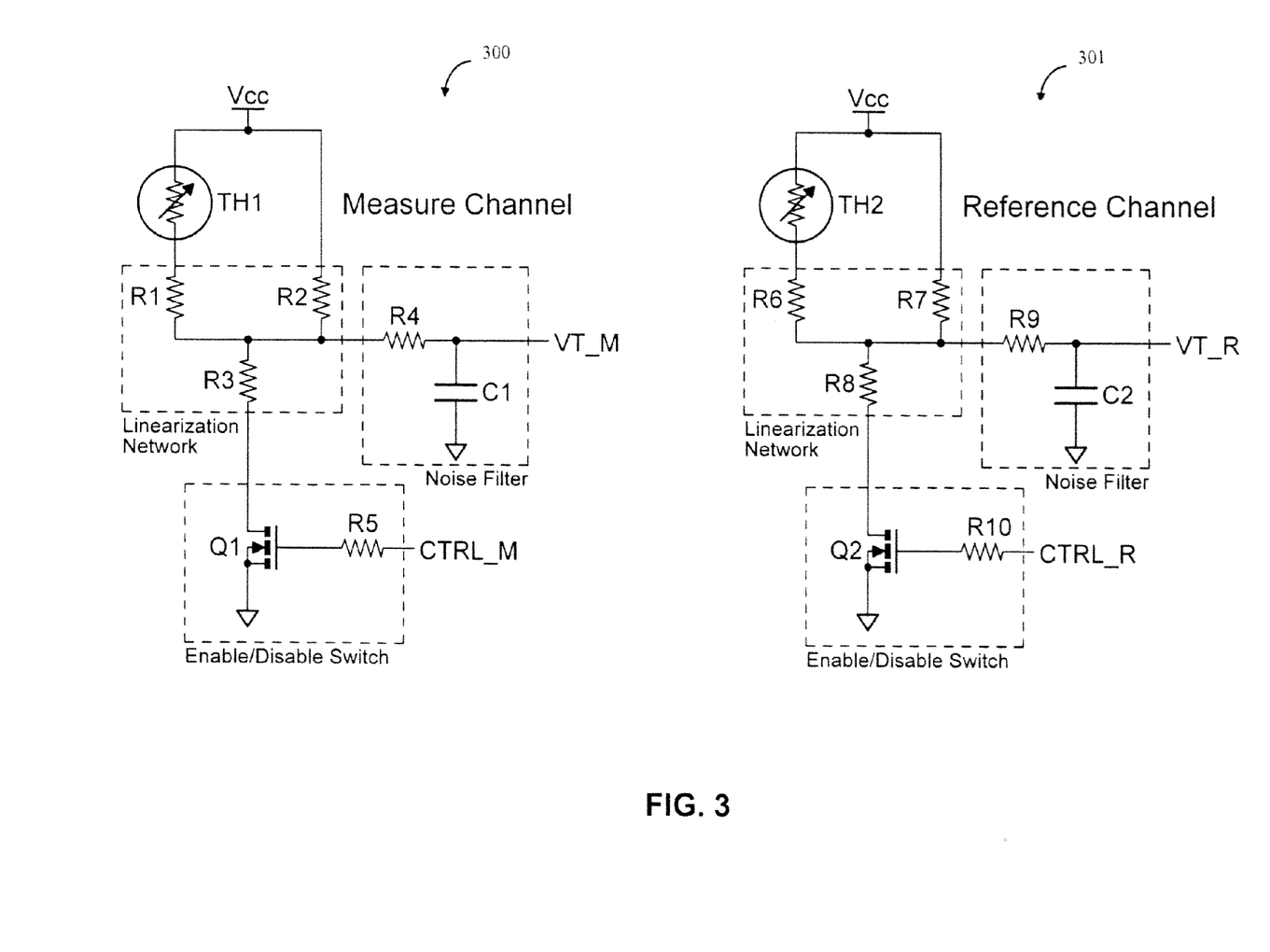
FIG. 3 is a schematic diagram of an exemplary aspect of the present disclosure.

Referring now to FIG. 3, illustrated are exemplary aspects of a pair of thermistor circuits for the first and second device 140 and 142 of FIG. 2, which sense airflow rates in an airflow passageway. A first thermistor circuit 300 operates as a Measure device and is activated by an enable/disable switch circuit having a first transistor Q1 coupled to a resistor R5 and controlled by a microprocessor (or other means). The enable/disable switch controls the amount of power dissipated by the Measure device, thermistor TH1, according to a signal CTRL_M. A "Hi" state at CTRL_M enables the switch transistor Q1, and thus forces Measure device TH1 to dissipate power; it is during this state that output voltage VT_M is sampled by the microprocessor (or other circuitry). CTRL_M is configured to represent a large duty cycle (i.e. is mostly "On" with very little "Off" time), so that the power dissipated by TH1 is relatively large. A second thermistor circuit 301 operates as a Reference device and is activated by a second enable/disable switch having a second transistor Q2 coupled to a resistor R10 and controlled by a microprocessor (or other means). The enable/disable switch of circuit 301 is activated briefly when the control circuit 144 of FIG. 2 provides a signal CTRL_R to measure ambient air temperature. A "Hi" state at CTRL_R enables the switch transistor Q2, and thus activates Reference device TH2 so that the output voltage VT_R represents the temperature of the Reference device, which is sample by the microprocessor (or other circuitry).

The circuits 300 and 301 include a thermistor TH1 and TH2 respectively, in which a resistance therein varies according to changes in temperature. While thermistors are discussed herein, the disclosure is not limited to thermistors and also envisions using diodes, transistors and RTDs as also being within the scope of this disclosure for measuring a temperature differential therebetween. The thermistors TH1 and TH2 are connected in series respectively to resistors R1 and R6, which have fixed resistances, and to a voltage Vcc thereat. Resistors R2 and R7 are configured in parallel to the thermistors of each circuit and resistors R1 and R6, wherein a linearization network is formed with resistors R3 and R8 of each circuit 300 and 301. The resistors R1, R2, and R3, surrounding the first device TH1 (and similarly R6, R7, and R8, surrounding the second device TH2) are provided to linearize the voltage with respect to temperature, and any series/parallel combination of one or more resistors can be used to perform this linearization function. Other linearization schemes are also envisioned, such as single or two resistor schemes. Resistors R4 and R9 form a low pass filter with capacitors C1 and C2 respectively to provide the signals Vt_M and Vt_R which indicate their respective thermistor's temperature, and which are sampled by a microprocessor (or other circuitry).

Transistors Q1 and Q2 are illustrated as MOSFET devices, but are not limited to any particular solid state device and may include BJT, FET devices, and the like; they could also be relays. The transistors Q1 and Q2 are each coupled to resistors R3 and R8 at a respective terminal and to resistors R5 and R10 at another terminal respectively. The terminals of the transistors Q1 and Q2 provide for control signals Ctrl_M and Ctrl_R for controlling the measurement of the voltage differential therebetween.

Figure 4:
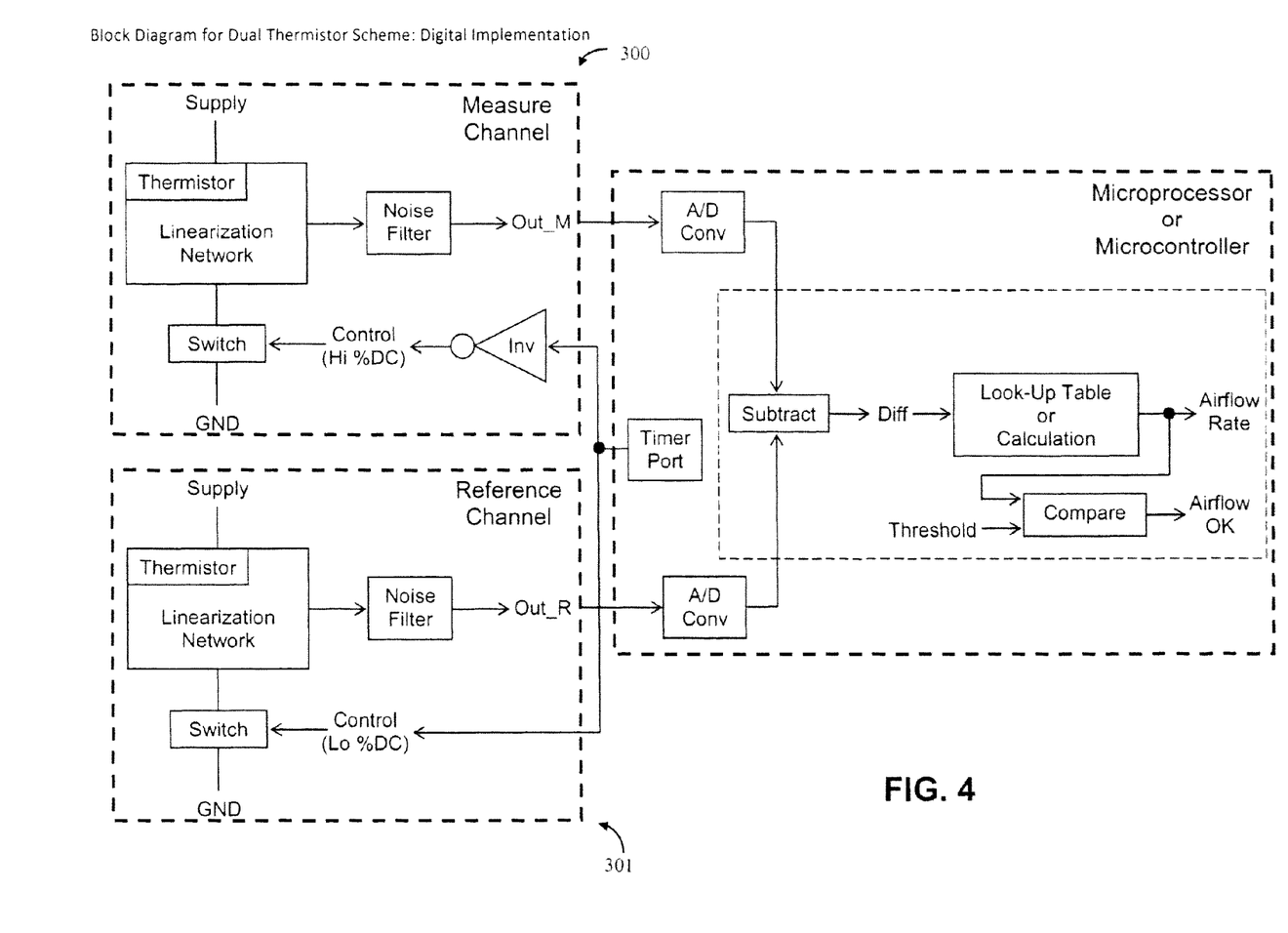
FIG. 4 is a block diagram of another exemplary aspect of the present disclosure.
Figure 5:
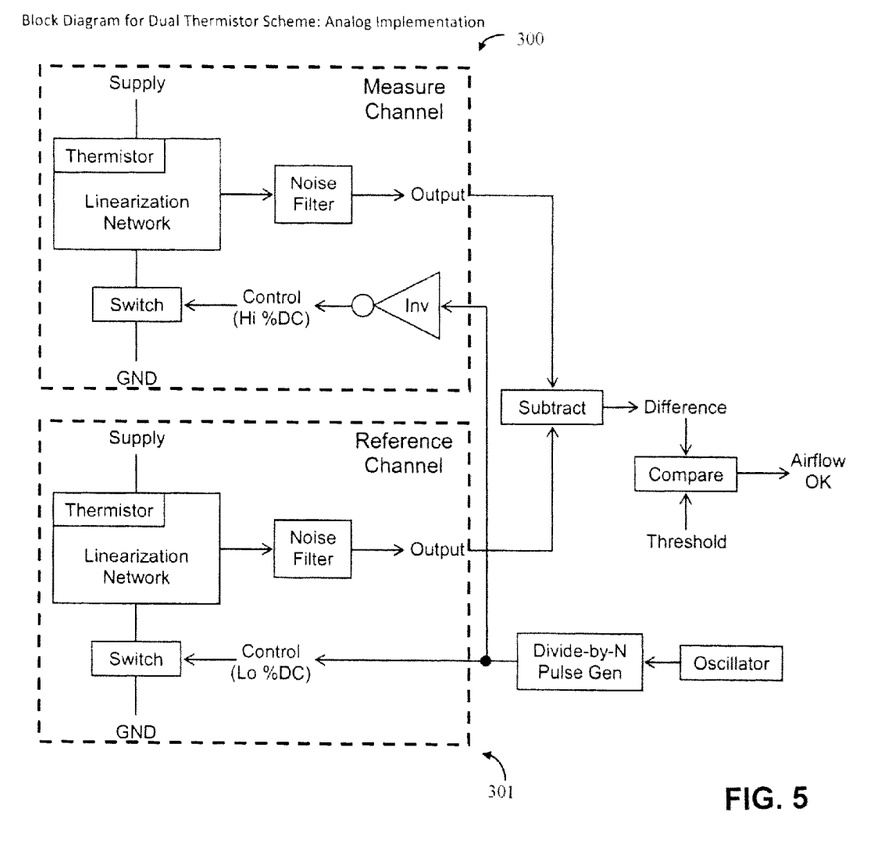
FIG. 5 is a block diagram of another exemplary aspect of the present disclosure.

Referring to FIGS. 4 and 5, illustrates digital and analog implementations of the present disclosure respectively.

In one embodiment, FIGS. 4 and 5 illustrated a single control port where circuits 300 and 301 are controlled. For example, control to a switch for measure circuit 300 has a high duty cycle (Hi % DC) to dissipate considerable power and self heat. Reference circuit is operate with a low duty cycle (Lo % DC) to maintain low power dissipation in the thermistor of the circuit. A single control port is used to operate both circuits where CTRL_M (from FIG. 3), for example, is the inverse of CTRL_R as indicated by the inverter (INV). Therefore, a single very low duty % DC when inverted creates a very high % DC signal and only one clocking signal is implemented. Different signals may further be envisioned in other implementations and the present disclosure is not limited to only one clocking signal.

FIG. 4 illustrates a digital implementation where the outputs of each device 300 and 301 are provided to an analog/digital converter (A/D) for conversion to a digital representation and those digital representations are subsequently subtracted to obtain a voltage difference. The differential corresponds to a difference in temperature between the measure device and the reference device that is inversely proportional to the rate of airflow. The measurements are calculated at a periodic rate (e.g., once per second or the like) and the temperature difference is used by calculation formula or a look-up table in order to determine the amount of airflow in the system. The look-up table and formula (both not shown) may be provided in a memory of the control circuit 144, for example, and used for determining an airflow rate of an appliance. A threshold or predetermined level may be compared to the airflow rate to determine whether it is sufficient or not according to desired levels. Because substantially identical thermistors are used, the microprocessor could alternately use each thermistor as the "Reference" (low power dissipation) and the "Measure Sensor" (high power dissipation), thus balancing-out (sharing) the aging effects on the thermistors, making sure that both devices' characteristics shift identically throughout the life of the product.

The measure device 300 and the reference device 301 provide a voltage differential. The measure device 300 and reference device 301 are operated in such a manner that the measure device 300 experiences significantly more power dissipation than the reference device 301, therefore, the measure device 300 self-heats significantly more than the reference device 301. This is accomplished by Pulse Width Modulating (PWM'ing) the two devices at different duty cycles. For instance, the measure device can be operated at 99% while the reference device can be operated at 1% (i.e. the same PWM control signal can be used to drive both circuits, with one circuit using an inverted representation of the control signal), thus the measure device would dissipate 99× the power of the reference device. Alternatively, the measure device could be operated continuously (100%) while the reference device is activated infrequently (e.g., at 1 ms once every second). FIG. 4 illustrates a single processor timer port to control the switches, however, addition timer ports could also be used, and an external clock could also be used in the clocking signal provided into the microprocessor to synchronize the A/D converter readings of the thermistor signals from the measure device 300 and the reference device 301.

FIG. 5 illustrates an analog implementation where the difference in voltages generated by the two devices is compared against a reference voltage to determine if the airflow rate is above/below a predetermined threshold. An oscillator coupled to a divide-by-N-pulse generator provides the duty cycle signal to the circuits 300 and 301, where only one signal is used here for example to generate very high and very low % Duty Cycle control signals to the respective circuits.

Figure 6:
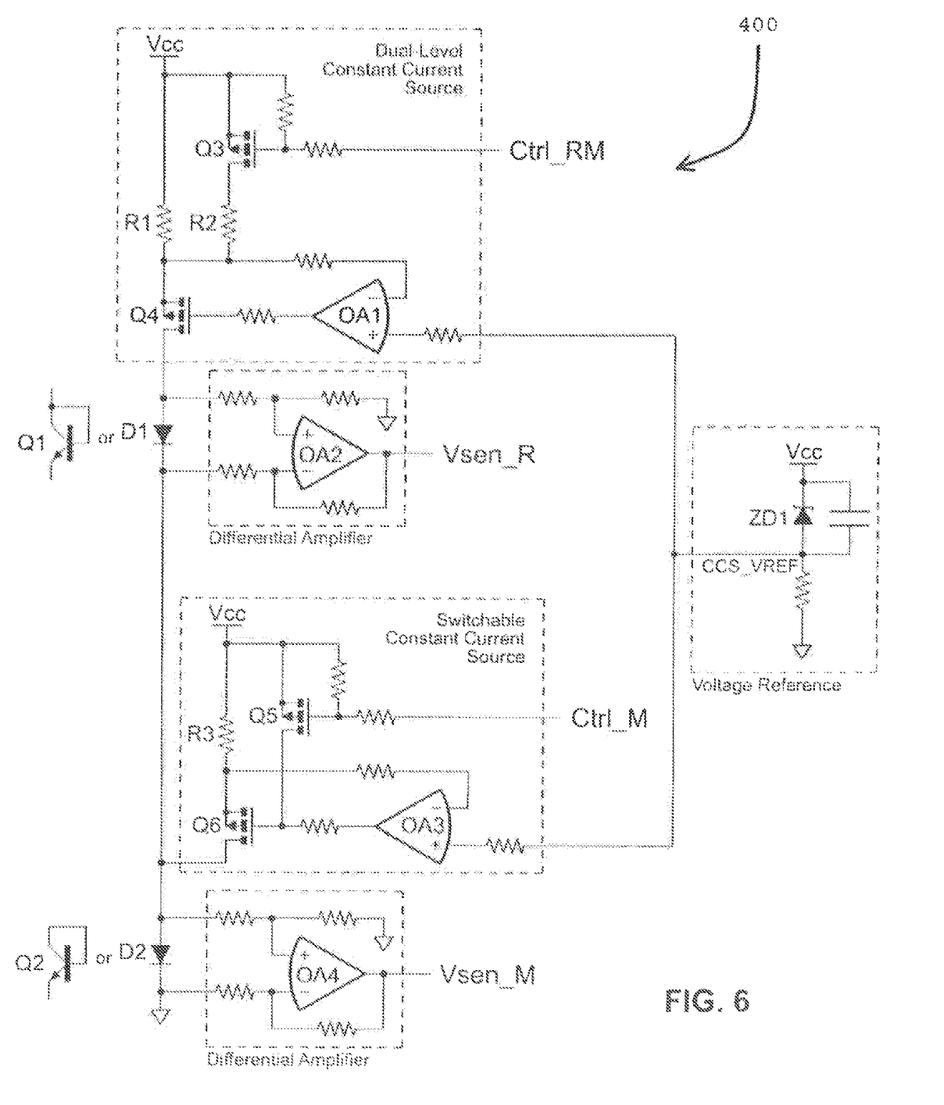
FIG. 6 is a schematic diagram of another exemplary aspect of the present disclosure.

Referring now to FIG. 6, illustrated is another exemplary aspect of a dual transistor (or diode) circuit 400 for measuring a temperature differential within an airflow for an airflow detector in an appliance. The circuit 400 includes diodes D1 and D2 that operate as Reference and Measure devices, respectively. Alternatively, other devices can be used, such as diode-connected transistors (where collector and base terminals are connected). A transistor Q4 is coupled at a terminal to an operational amplifier OA1 via a resistor in order to form a dual-level constant current source (DLCCS) with a voltage reference signal CCS_VREF provided at a positive terminal of the amplifier OA1. The DLCCS is provided through the transistor Q4 from a different terminal to supply the diodes D1 and D2 (or transistors Q1 and Q2). A signal Ctrl_M is provided to transistor Q3 in order to control the DLCCS in order to generate two distinct current levels at a 10:1 ratio, for example, or any fixed ratio. The current is then passed through both diodes D1 and D2 (or transistors Q1 and Q2) in series so they receive substantially the same amount of current thereat. The ratio of 10:1 or other like ratios enables the control circuit 144 of FIG. 2 to calculate the temperature of the two transistor devices as a first device 140 and a second device 142 discussed above. The changes in voltage across the diodes' anode and cathode (or transistors' base and emitter) terminals allows for this calculation of temperature from the measurements of Vsen_M and Vsen_R. During most times Ctrl_RM commands a low current so that the Reference device D1/Q1 does not significantly self-heat and is essentially off. A Ctrl_M signal commands a second voltage reference at the switchable constant current source (SCCS) to force more current into the measure transistor device D2 (or Q2) so that it heats up accordingly. Current from the SCCS is injected into the circuit at a point where it only passes-through the Measure device D2/Q2. As was discussed earlier, there are 3 phases to controlling these current sources. Phase 1 (heat-up of the Measure device) controls the SCCS via signal Ctrl_M. Phases 2 and 3 (measure the temperature of both devices) controls the DLCCS via signal Ctrl_RM.

Figure 7:
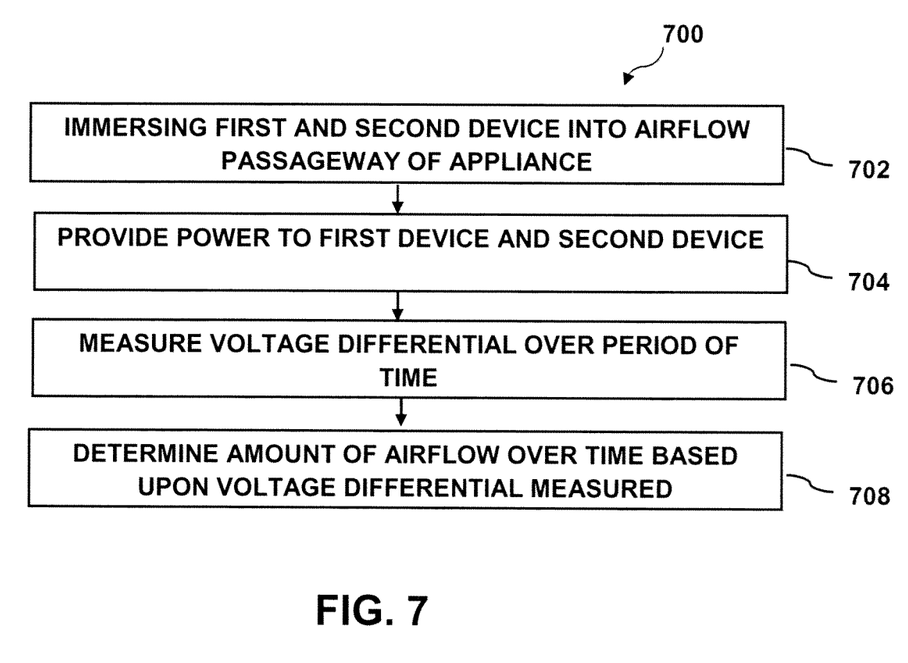
FIG. 7 is a flow diagram for detecting an airflow rate in an airflow passageway of an appliance according to an exemplary aspect of the present disclosure.

Example methodology 700 of a flow diagram for detecting an airflow rate in an airflow passageway of an appliance is illustrated in FIG. 7 and is described with reference to FIGS. 1-6. While the method is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At 702, the method 700 begins and is referenced above upon immersing a first device 140 and a second device 142 into an airflow passageway of an appliance 100, for example. The devices can include thermistors, diodes, transistors and/or RTDs for measuring a differential between the two devices, which are substantially thermally insulated from one another. The impedance within each solid state device for measure airflow rate is the same in certain embodiments, but can vary in other embodiments.

At 704, power is provided to each device. A constant current source is maintained to power the devices. When a measurement is made by a processor, for example, a signal is provided, such as a pulse width modulated signal to power one of the devices with additional current and causes the device to increase in temperature. Alternatively, where impedances within the solid state devices vary at a given ratio, no additional current source signal is provided.

At 706, a first voltage differential is measured over a period of time between the first device and the second device. At 708, this differential is utilized to determine an amount of airflow over time. For example, an increase in the voltage differential indicates a lower airflow over the time measured and a decrease in the voltage differential indicates a higher airflow over the time measured.

The invention has been described with reference to the preferred embodiments. Obviously, modifications and alterations will occur to others upon reading and understanding the preceding detailed description. It is intended that the invention be construed as including all such modifications and alterations.

What is claimed is:

1. An appliance comprising:
an oven chassis;
at least one cooling air blower;
a cooling air passageway for circulating cooling air from the at least one cooling air blower within and/or around at least a part of the oven chassis;
an air flow measuring device for determining the rate of air flowing through the cooling air passageway and is immersed within an air flow stream of the cooling air passageway and which includes a first sensing device supplied with a current flowing therethrough and causing the first sensing device to dissipate a power such that the first sensing device exhibits a significant self-heating effect, the significant self-heating effect of the first sensing device being dependent on the rate of air flowing through the cooling air passageway, and a second sensing device supplied with a current flowing therethrough and causing the second sensing device to dissipate a power such that the second sensing device that exhibits a significantly smaller self-heating effect than the first sensing device due to an amount of current that flows through the second sensing device; and
a controller that monitors temperature dependent electrical characteristics of the first sensing device and the second sensing device, and utilizes differences in temperatures or temperature-dependent electrical characteristics between the first sensing device and the second sensing device of the airflow measuring device to calculate airflow within the cooling air passageway.

2. The appliance of claim 1,
wherein the first sensing device and the second sensing device are thermally isolated from each other and both sensing devices are in thermal contact with the airflow being measured.

3. The appliance of claim 1, wherein the first sensing device and second sensing device are both electronic devices and in which the first sensing device dissipates a higher power than the second sensing device to produce a greater temperature differential between the first and second sensing devices when substantially no air flow occurs thereover than when a substantial amount of air flows thereover.

4. The appliance of claim 1, wherein the first sensing device and the second sensing device exchange operational roles periodically with one another wherein the first sensing device is operated at lower power having the significantly smaller self-heating effect and the second sensing device is operated at higher power having significant self-heating to provide substantially uniform wearing of the devices during product operation.

5. The appliance of claim 1, further comprising:
a heat source
wherein the controller interprets the temperature-dependent electrical characteristics of the two sensing devices within the air flow measuring device to determine air flow rate within the air flow passageway and de-energizes the heat source when the calculated air flow rate is below a prescribed threshold and allows activation of the heat source when the calculated air flow rate is above a prescribed threshold.

6. The appliance of claim 1, wherein the controller powers the first sensing device at a substantially greater duty cycle than the second sensing device that causes the first sensing device to dissipate substantially more power than the second sensing device so that a greater temperature differential exists when less air is flowing thereover than when more air is flowing thereover.

7. The appliance of claim 1, wherein the first and second sensing devices are arranged in a Wheatstone bridge circuit configuration that creates two measurement nodes, the voltage difference between these nodes changing according to the temperature difference between the first and second sensing devices, and in which this voltage difference is used by the controller to determine the air flow rate within the air passageway.

8. The appliance of claim 7, wherein the first and second sensing devices arranged in a Wheatstone bridge circuit configuration are any of a thermistor, a resistance temperature device (RTD), a thermocouple, a diode, a diode-connected transistor, or any of the aforementioned devices thermally bonded to a heat-dissipating device.

9. The appliance of claim 7, wherein the first sensing device exhibits a substantially lower impedance than the second sensing device thereby causing the first sensing device to dissipate substantially more power than the second sensing device so that a greater temperature differential exists between the first and second sensing devices when less air is flowing thereover than when more air is flowing thereover, and wherein the controller determines a difference in temperature-dependent voltages and/or a difference in temperature between the two sensing devices with an analog means having an operational amplifier, instrumentation amplifier, or comparator, or with a digital means having a microprocessor with analog/digital ports to sample the two voltages and calculate the voltage differences.

10. The appliance of claim 7, wherein the first sensing device is supplied with a substantially greater current and/or voltage than the second sensing device thereby causing the first sensing device to dissipate substantially more power than the second sensing device so that a greater temperature differential exists between the first and second sensing devices when less air is flowing thereover than when more air is flowing thereover.

11. The appliance of claim 7, wherein the first sensing device is operated at a substantially greater duty cycle than the second sensing device thereby causing the first sensing device to dissipate substantially more power than the second sensing device so that a greater temperature differential exists between the first and second sensing devices when less air is flowing thereover than when more air is flowing thereover.

12. The appliance of claim 1, wherein the first and second sensing devices are either a diode or a diode-connected transistor which are both operated periodically at two or more low current levels to measure the devices temperatures without causing significant self-heating of the devices, and in which the first sensing device is also periodically operated at a substantially larger current level so that significant self-heating occurs when temperature measurements are not being taken, and in which the temperature difference between the sensing devices is calculated and used by the controller to determine the rate of air flow within the air passageway.

13. The appliance of claim 12, wherein the first and second sensing devices are operated periodically at two or more substantially differing low current levels by means of one or more constant current source driver circuits whose output current level is controlled by the controller, and in which the voltages of both sensing devices is measured by the controller while operating at each of the commanded current levels.

14. The appliance of claim 12, wherein the first sensing device is operated periodically at a current level which is sufficiently large to cause self-heating of the first sensing device.

15. The appliance of claim 12, wherein the sensing device temperatures are calculated by the controller using the device voltages measured at two or more low current levels using the well-known "Brokaw Bandgap" equation, and in which the difference in calculated temperatures between the first and second sensing devices is used by the controller as an indication of the air flow rate within the air passageway.

16. The appliance of claim 1 wherein the air flow measuring device is disposed in an oven operating environment having a temperature range of about 200 degrees F. to about 500 degrees F.

* * * * *